United States Patent Office 3,563,991
Patented Feb. 16, 1971

3,563,991
1-OXO-1,2,3,4-TETRAHYDROPHENAZINE-5,10-DIOXIDES
James David Johnston, Allendale, N.J., assignor to Chas. Pfizer & Co. Inc., New York, N.Y., a corporation of Delaware
No Drawing. Application Dec. 18, 1968, Ser. No. 798,546, now Patent No. 3,507,870, which is a division of application Ser. No. 587,420, Oct. 18, 1966, now Patent No. 3,480,713, which in turn is a continuation-in-part of application Ser. No. 502,602, Oct. 22, 1965. Divided and this application July 10, 1969, Ser. No. 840,817
Int. Cl. C07d 51/80
U.S. Cl. 260—267
9 Claims

ABSTRACT OF THE DISCLOSURE

A series of 1-oxo-1,2,3,4-tetrahydrophenazine-5,10-dioxides and the non-toxic salts thereof useful in controlling chronic respiratory disease in poultry and in promoting growth and improving feed efficiency of animals in general.

CROSS-REFERENCE TO RELATED APPLICATIONS

This application is a division of copending application Ser. No. 798,546, filed Dec. 18, 1968 now U.S. Pat. 3,507,870, which in turn is a division of copending application Ser. No. 587,420, filed Oct. 18, 1966 now U.S. Pat. 3,480,713, which in turn is a continuation-in-part of application Ser. No. 502,602, filed Oct. 22, 1965, and now abandoned.

BACKGROUND OF THE INVENTION

This invention relates to methods for the control of chronic respiratory disease in poultry and for the promotion of growth and improvement of feed efficiency in animals and to compounds useful for such purposes. More particularly, it relates to the use of a series of 1,2,3,4-tetrahydrophenazine-5,10-dioxides and certain derivatives thereof as agents for the control of infectious sinusitis in turkeys, chronic respiratory and complicated chronic respiratory infections in poultry and for the promotion of weight gain and feed consumption of animals.

Mycoplasma, especially *M. gallisepticum*, *M. gallinarum*, *M. inera*, *M. synovaei*, and type N–PPLO are the primary agents responsible for chronic respiratory, and related diseases of poultry, especially of chickens, end of infectious sinusitis of turkeys. The field condition commonly known as "air sac" disease, air sacculitis or complicated chronic respiratory disease is generally considered to involve Mycoplasma and secondary infections, especially those caused by coliform, Proteus and Micrococcus species. Throughout this application the term "chronic respiratory disease" also includes "complicated chronic respiratory disease," "infections sinusitis," and related diseases.

The economic significance of such diseases has led to extensive research on practical measures of immunization and effective therapeutic products; however, despite the availability of a number of compounds having therapeutic activity of one type or another, e.g., antibacterial, antiviral, the countermeasures developed to date have not been satisfactory. No treatment has been developed which will satisfactorily prevent infection, eliminate the infection from a flock, prevent the shedding of the infectious organism in the eggs, and maintain normal or almost normal weight gain and feed consumption in the presence of such infection.

SUMMARY OF THE INVENTION

It has now been found that 1,2,3,4 - tetrahydrophenazine - 5,10 - dioxide; 1 - hydroxy - 1,2,3,4 - tetrahydrophenazine - 5,10 - dioxide; 1,4 - dihydroxy - 1,2,3,4-tetrahydrophenazine - 5,10 - dioxide; 1,4 - di(lower alkanoyloxy) - 1,2,3,4 - tetrahydrophenazine - 5,10 - dioxide; 1,4 - dibromo - 1,2,3,4 - tetrahydrophenazine - 5,10-dioxide and certain novel derivatives thereof having the following formulae:

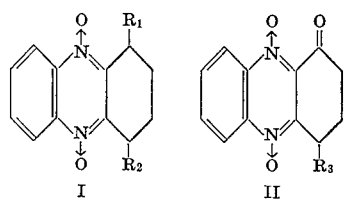

and

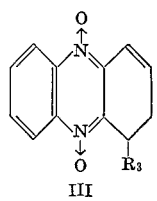

wherein $R_1$ is selected from the group consisting of lower alkoxy, mercapto, lower alkylmercapto, lower alkanoyloxy, benzoyloxy, p-toluenesulfonyloxy, cyano carboxy and carbo(lower)alkoxy; $R_2$ is selected from the group consisting of hydrogen, hydroxy, chloro, bromo, lower alkoxy, mercapto, lower alkylmercapto, cyano, carboxy, carbo(lower)alkoxy, benzoyloxy and p-toluenesulfonyloxy; $R_3$ is selected from the group consisting of $R_2$ and lower alkanoyloxy; are highly effective in maintaining weight gain and feed consumption of poultry in the presence of chronic respiratory disease and in controlling chronic respiratory disease, and in accelerating growth and improving feed efficiency of animals in general.

Of the lower alkoxy, lower alkylmercapto and carbo-(lower)alkoxy and lower alkanoyloxy groups, those having from one to four carbon atoms in the alkoxy, alkylmercapto and alkanoyloxy coieties are preferred since they are more readily prepared than are those having a greater number of carbon atoms.

Also included within this invention are the isomeric compounds of Formula I, the non-toxic mineral acid addition salts of the herein described bases and the non-toxic alkali metal and alkaline earth metal salts of those compounds wherein $R_1$ and/or $R_2$ is carboxy. By "non-toxic" salts is meant those salts which do not cause a toxic reaction to the animal in the dosages administered. The preferred acid addition salts of the above-mentioned bases which may be employed are the hydrochloride, hydrobromide, phosphate, nitrate and sulfate. The non-toxic metal salts of particular interest are the sodium, potassium, calcium and magnesium salts.

The isomeric forms are separated by various methods such as fractional crystallization, column chromatography, and complex formation with dimethyl sulfoxide, the preferred method.

DETAILED DESCRIPTION OF THE INVENTION

The preferred method for separating the isomeric 1,4-dihydroxy - 1,2,3,4 - tetrahydrophenazine - 5,10 - dioxides comprises dissolving the mixture of isomers in dimethylsulfoxide. One isomer (A) forms an insoluble complex with dimethylsulfoxide which readily precipitates from solution. The other isomer (B) remains in solution and is recovered therefrom by suitable means as by evaporation of the solvent or by addition of a solvent miscible with dimethylsulfoxide and in which isomer B is poorly soluble, e.g., benzene, acetone, water. Isomer A is recovered from the complex by crystallization from a suitable solvent such as chloroform, benzene, methylene chloride, tetrahydrofuran, acetone, ethyl acetate, acetonitrile, lower alcohols (especially those containing one to four carbon atoms), water and mixtures of such solvents. Chloroform-hexane is especially favorable for recovering and purifying isomer A. Benzene is an especially good solvent for purifying isomer B by recrystallization.

This isomer separation is desirably conducted at a temperature of from about 20° to about 40° C. Higher or lower temperatures appear to offer no advantage. The favored temperature range is from about 20° to 30° C. A sufficient volume of dimethylsulfoxide is advantageously used to completely dissolve the mixture of isomers. Volumes of from about 3 to about 7 ml. of dimethylsulfoxide per gram of isomeric mixture afford good separation. While it is not necessary to completely dissolve the isomeric mixture complete solution is favored in view of the better separation realized. Isomer A melts at 165°–166° C. (dec.) while isomer B melts at 170°–172° C. (dec.).

The valuable products described herein, many of which are novel, control not only the secondary infections associated with chronic respiratory disease but are surprisingly and unexpectedly effective against *Mycoplasma gallisepticum*, the primary organism believed responsible for the disease. Additionally, and highly important from an economic standpoint, they promote significant growth and improved feed efficiency of diseased and healthy poultry and of other economically important animals. Many of these compounds exhibit useful anthelmintic activity.

The antibacterial activity of several 2,3-polymethylene quinoxaline 1,4-dioxides has been reported in the literature. Ursprung, U.S. Pat. 2,891,062, describes the activity of certain 1-hydroxy- and 1,4-dihydroxy-1,2,3,4-tetrahydrophenazine - 5,10 - dioxides as anti-infective agents, especially against *Proteus vulgaris*. The antipathogenic, especially anti-fungal, activity of the isomeric 1,4-dibromo-1,2,3,4-tetrahydrophenazine-5,10-dioxides is disclosed by Gordon et al. in U.S. Pat. 2,921,937. This same reference also discloses certain 1,4-diacylated 1,2,3,4-tetrahydrophenazine-5,10-dioxides useful as intermediates for the production of the corresponding 1,4-dihydroxy compounds. Iland (Nature 161, 1010, 1948) and McIlwain (J. Chem. Soc. 323–325, 1943) describe the antibacterial properties of 1,2,3,4-tetrahydrophenazine-5,10-dioxide.

Hurst et al., Brit. J. Pharmacol. 8, 297–305 (1953) report on the activity of several 1,2,3,4-tetrahydrophenazine-5.10-dioxides and of 2,3-pentamethylenequinoxaline 1,4-dioxides against the largest viruses of the psittacosis-lymphogranuloma group and note that toxic side-reactions preclude their use in man. The latter compound was found to be, at most, only slightly active against the viruses studied. Landquist, J. Chem. Soc. 2551–2553 (1956) describes the preparation of a series of 2,3-polymethylene quinoxaline-1,4-dioxides wherein the polymethylene moiety is tri-, tetra- and penta-methylene as potential chemotherapeutic agents. The preparation and bacteriostatic study of several substituted 1,2,3,4-tetrahydrophenazine-5,10-dioxides are reported by King et al., J. Chem. Soc. 3012–3016 (1949).

Despite the early disclosure of the antibacterial properties of several 1,2,3,4-tetrahydrophenazine-di-N-oxides and the concerted efforts to develop effective therapeutic measures against chronic respiratory disease, the efficacy of the compounds described herein for the control of chronic respiratory disease was not recognized until the present invention.

The herein described 1,2,3,4-tetrahydrophenazine-5,10-dioxides and derivatives thereof are particularly effective in the control (prophylaxis and treatment) of chronic respiratory disease in poultry, especially in chickens and turkeys and in maintaining weight gain and feed consumption in the presence, and in the absence, of such infection. For this purpose and for the other purposes described herein, these valuable products can be administered orally or parenterally. Subcutaneous and intramuscular injections are the preferred methods of parenteral injection for several reasons; simplicity, convenience and the compounds appear less toxic. According to the present invention, the compounds described herein are administered orally or parenterally, e.g., by subcutaneous or intramuscular injection, to poultry in a dosage of from about 1 mg./kg. to about 100 mg./kg. of body weight for the control of chronic respiratory disease. When administered orally, it is preferred to use a dosage of from about 1 mg./kg. to about 60 mg./kg. of body weight. For parenteral administration dosages of from about 10 mg./kg. to about 100 mg./kg. of body weight are preferred. These compounds can be used either in the form of solutions or suspensions, aqueous or non-aqueous. When administered parenterally, a single dose is generally sufficient but, in the event multiple doses are employed, the dosage is repeated at a suitable interval, e.g., weekly, monthly. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide, and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as hyaluronidase (spreading factor), local anesthetics and inorganic salts to afford desirable pharmacological properties.

In general, no tissue irritation results from the subcutaneous injection of these compounds. However, as a precaution against possible irritation and to facilitate absorption, parenteral administration of these compounds in combination with hyaluronidase can be employed. An increase in the rate of absorption of the drug is observed and the occasional discomfort on injection is greatly reduced, if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the poultry following injection of the drug preparation.

Dry mixtures containing the active ingredients together with salt (sodium chloride) and/ or buffering agents or local anesthetics are prepared for extemporaneous use. A concentration of active ingredient in such mixtures of at least about 50 percent is useful.

According to a further modification of the present invention, these valuable compounds are administered to poultry by the oral route in a dosage of from about 1 to about 60 mg./kg. of body weight. This can be achieved by a number of methods including mixing with the feed, the preparation of concentrates, dosage unit formulations such as capsules, tablets, liquid mixtures and solutions, or they can be administered in admixture with minerals such as sodium chloride, which are frequently fed to poultry as a supplement. Dilute solutions or suspensions, e.g., a 0.1 percent solution, can be supplied for drinking purposes.

For prophylactic use, about 10 to about 100 mg./kg. of body weight daily is administered. The above methods of administration are suitable although administration in the animal's feed, water, or mineral mixture is more convenient.

In still another modification of this invention, the poultry are isolated and subjected, in a confined space to a fine dust of silica on which is dispersed or adsorbed one or more of the herein described compounds. The silica, comprising particles of up to 20 mμ or less size, is suspended in the air breathed by the poultry.

The unique feed compositions of this invention are found to be particularly valuable for use with poultry and especially for poultry infected with chronic respiratory disease. A type of conventional feed material which may be employed is recommended to contain roughly between 50 percent and 80 percent of grains, between 0 percent and 10 percent animal protein, between 5 percent and 30 percent vegetable protein, between 2 percent and 4 percent minerals together with supplemental vitaminaceous sources. When a feed containing a major proportion of these substances and a minor proportion of one of the herein mentioned drugs is employed, the poultry shows a marked improvement, if not complete recovery, over the infection and reach the desirable weight in a shorter period of time than usual with a markedly greater feed efficiency. It should be noted that these valuable products eliminate, or at least minimize, the economic losses normally associated with chronic respiratory disease.

Further, the addition of a low level of one or more of the herein described 1,2,3,4-tetrahydrophenazine-5,10-dioxides and derivatives thereof to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of such animals as poultry, rats, hogs, swine, lambs, cattle and the like. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency. Feed efficiency, an extremely important economic factor in raising animals, may be defined as the number of pounds of feed required to produce a pound gain in weight. The novel feed supplements of this invention permit the use of higher energy, higher protein diets to obtain improved feed/gain ratios and the use of feedstuffs that at present are not utilized efficiently. Simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the quinoxaline-di-N-oxides described above. Some of the various components are commonly grains such as ground grain, and grain by-products; animal protein substances, such as meat, and fish by-products; vitaminaceous mixtures, e.g., vitamin A and D mixtures, riboflavin supplements and other vitamin B complexes; and bone meal, limestone, and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10 percent of the active ingredient mixed with salt (sodium chloride) and other minerals which it is desired to incorporate into the poultry ration. This can be fed on an ad libitum basis by adjusting the proportion of active ingredient in the mixture to the average daily consumption per bird so as to provide the proper daily dose as specified above. If prepared feed supplements are employed, the material can be administered in admixture with the feed. Again, a concentration range of about 0.10 to 10 percent of the drug in the feed is employed. However, higher proportions can be satisfactorily employed depending upon the palatability of the product to the poultry. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for theraputic use.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with one pound of limestone or one pound of limestone-soybean oil meal (1:1). Other dietary supplements, such as vitamins, minerals, etc., may be added to the concentrates in the appropriate circumstances.

The high potency concentrates may be blended by the feed manufacture with proteinaceous carriers, such as soybean oil meal, to produce concentrated supplements which are suitable for direct feeding to animals. In such instances, the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 10 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The valuable compounds of this invention, many of which are new, are readily prepared by methods well known in the art. The most convenient methods from the standpoint of availability of materials, ease and simplicity of reaction, yield and purity of product for preparing the parent 1,2,3,4-tetrahydrophenazine are the condensation of o-phenylenediamine with 1,2-cyclohexanedione or the monoxime or bisulfite addition compound thereof, and of the reaction of cyclohexanone with o-aminoazobenzene. The parent 1,2,3,4-tetrahydrophenazine thus obtained is then oxidized by means of peracids, e.g. hydrogen peroxide in glacial acetic acid, peracetic acid, perbenzoic acid, m-chlorperbenzoic acid, performic acid or monoperphthalic acid, to the corresponding mono- or dioxide depending upon the molar proportion of oxidizing agent used.

The mono- or dioxide is then treated with a lower alkanoic acid anhydride, benzoic acid anhydride, alkanoic acid halide, benzoyl chloride, p-toluenesulfonyl chloride, to produce the corresponding 1-substituted-lower alkanolyoxy-1,2,3,4-tetrahydrophenazine compound, or in the case of the dioxide the corresponding 1,4-di(lower)alkanoyloxy-1,2,3,4-tetrahydrophenazine compound or the corresponding benzoyloxy or p-toluenesulfonyloxy compounds, in a Boekelheide rearrangement. Peracid oxidation of the resulting compounds affords the desired substituted 1,2,3,4-tetrahydrophenazine-5,10-dioxides. Acid hydrolysis provides the corresponding mono- or di-hydroxy derivatives.

The rearrangement is conveniently conducted by heating the 1,2,3,4-tetrahydrophenazine 5-oxide or 5,10-dioxide at an elevated temperature, e.g. from about 50° C. to the boiling point of the solvent medium, with an excess of the desired lower alkanoly anhydride. The excess anhydride generally serves as solvent medium. However, reaction-inert solvents, that is, solvents which do not react in an undesired manner with the reactants or products under the conditions of the reaction can be used. Alternatively, the lower alkanoyl anhydride may be replaced by the corresponding acid halide, especially the acid chloride. A minimum of laboratory experimentation will permit the selection of suitable solvents for this reaction. Exemplary of such solvents are dioxane, tetrahydrofuran, carbon tetrachloride, chloroform, methyl ether of diethylene glycol and the methyl ether of ethylene glycol. The reaction is run for a period of about thirty minutes, or longer if necessary, and the product recovered by removal of the excess lower alkanoyl anhydride and/or solvent medium.

Alternatively, the 1-monohydroxy and the 1,4-dihydroxy-1,2,3,4 - tetrahydrophenazine - 5,10 - dioxides are prepared by the procedure of Ursprung in U.S. Pat. 2,891,062 which comprises contacting 1,2,3,4-tetrahydrophenazine with from about 0.5 to about 2.0 molar proportions of a perorganic acid for at least a day. Still another and elegant method for producing 1,2,3,4-tetrahydrophenazine-5,10-dioxide in a single step reaction is that described by Haddadin et al., in Tetrahedron Letters, No. 36, 3253–3256 (1965) which comprises the reaction of 1-morpholino-1-cyclohexene with isobenzofuroxan in warm methanolic solution.

In still another method, 1,4-dihydroxy-1,2,3,4-tetrahydrophenazine-5,10-dioxide is prepared by hydrolysis of the corresponding 1,4-di-(lower alkanoyloxy) derivative as described by Gordon in U.S. Pat. 2,921,937. In this method 1,2,3,4-tetrahydrophenazine-5,10-dioxide is reacted with from about 2 to about 8 moles of bromine per mole of dioxide at a temperature of from about 60° C. to 120° C. for from 1 to 3 hours in a suitable solvent system, e.g., liquid halogenated alkanes, liquid alkanes, N-methylformamide and N,N-dimethylformamide. The 1,4-dibromo compound thus produced is then reacted with a tertiary amine salt of the appropriate acid. The amine salt is conveniently, but not necessarily, formed in situ by simply mixing the amine and acid. Although any tertiary amine is suitable, pyridine, trimethylamine, triethylamine and dimethylaniline are favored because of their availability.

In general, an excess of the tertiary amine and acid, e.g., lower alkanoic acid, are used, about 2 to 3 moles of tertiary amine and about 4 to 5 moles of lower alkanoic acid per mole of dihalogenated compound. Larger or smaller ratios of amine and acid can be used but afford no advantages. Smaller ratios of amine and acid increase the length of time required for the reaction. The liquid alkanes and halogenated alkanes serve as solvents for this reaction. Temperatures of from about 15° to 120° C. and reaction periods of from about 1 to about 24 hours, provide satisfactory yields.

The 1,4-di(lower alkanoyloxy)-1,2,3,4-tetrahydrophenazine-5,10-dioxides and other acyloxy compounds serve as intermediates for the remaining novel products of this invention. For example, as mentioned above, acid hydrolysis converts the alkanoyloxy groups to hydroxy groups. Suitable acid hydrolyzing agents are the mineral acids, e.g., hydrochloric, hydrobromic, sulfuric, nitric, phosphoric. The reaction is generally conducted at a temperature of from about 10° C. to about 50° C., and preferably at room temperature for periods of from about 1 to about 24 hours. The concentrated form of the acid is favored since it accelerates the rate of reaction and affords better yields than do lower concentrations.

The formyloxy derivatives are prepared by the acylation of the corresponding mono- or dihydroxy compound, e.g., by means of acetoformic acid, at a temperature of from about −30° C. to about 50° C. or by formyl fluoride.

Acetoformic acid reagent suitable for the present process is prepared by mixing one volume of 100 percent formic acid with two volumes of acetic anhydride. Approximately 72 ml. of this reagent is equivalent to one mole of acetoformic acid anhydride. Excess of acetoformic acid reagent is employed when higher reaction temperatures are employed since the reagent is decomposed in the presence of basic substances to provide acetic acid and carbon monoxide. This side reaction becomes increasingly rapid above 10° C. Therefore, it is preferred to operate below this temperature. As a practical matter, the range from 0 to 10° C. is preferred for best results and economy. When operating in this temperature range, from 1.5 to 2 milliliters of acetoformic acid reagent per gram of reactant is satisfactory. An equimolecular proportion of the reagent is adequate at the lower level of the temperature range.

Diluents which are non-reactive and do not catalyze decomposition of the reagent at the reaction temperature can sometimes be advantageously employed in the present process. Illustrative of operable diluents are non-hydroxyl containing solvents such as dioxane, toluene, benzene, dimethylformamide, ethyl acetate, methyl isobutyl ketone, acetone, pyridine, quinoline, etc. Hydroxylated solvents such as the lower alkanols and glycols are not satisfactory due to the tendency of acetoformic acid reagent to react with these materials. It has been found that the present process is particularly adapted to the use of pyridine as a solvent medium.

The hydroxy group (or groups) can be replaced by chloro and bromo by reaction with thionyl chloride, thionyl bromide, phosphorous tribromide or phosphorous trichloride in the presence of a tertiary organic base such as pyridine, dimethyl- and diethylaniline.

The monohalo (chloro and bromo) derivatives of Formula I are preferably prepared by halogenation of 1,2,3,4-tetrahydrophenazine - 5,10 - dioxide in a reaction-inert solvent medium such as a liquid alkane, a liquid halogenated alkane and N-alkylated lower amide; e.g., n-hexane, chloroform, carbon tetrachloride, N-methyl formamide, N,N-dimethylformamide. Molar ratios of halogenating agents to 1,2,3,4-tetrahydrophenazine-5,10-dioxide of 1:1 favor production of monohalogenated derivatives. For the production of dihalogenated products molar ratios of about 2 to 8 moles of halogenating agent to starting compound are used. Larger amounts of halogenating agent can be used but afford no apparent advantages. The reaction is conducted at a temperature of from 15° to about 180° C. for a period of from about 1 to about 3 hours and most conveniently at the reflux temperature of the solvent medium for periods of from about 1 to about 5 hours.

Suitable halogenating agents for the present process include bromine; chlorine; iodochloride; iodobromide; N-chloro and N-bromo lower alkanoic acid amide, e.g., N-chloro and N-bromoacetamide; hydrocarbon dicarboxylic acid imides, e.g., N-chloro and N-bromo derivatives of succinimide and phthalimide, and the like and N-loweralkanoyl anilines, e.g., N-bromo-acetanilide, propionanilide and the like; 3-chloro-, 3-bromo-, 3,5-dichloro- and 3,5-dibromo-5,5-dimethylhydantoin; pyridinium perbromide and perchloride hydrohalides, e.g., pyridinium perbromide hydrobromide; pyridinium perchloride hydrochloride; and lower alkyl hydrochlorites, e.g., tertiary butylhypochlorite. It is obvious that, in general, any halogenating agent employed in the art is operable, but the above are preferred.

The products are thus obtained as their hydrohalide salts. The salts are converted to the free bases by treatment with an alkaline reagent such as an alkali metal or alkaline earth metal hydroxide, carbonate or bicarbonate.

The chloro and bromo groups are then converted by metathesis to cyano, mercapto, lower alkyl mercapto or lower alkoxy groups by a Williamson type reaction using metallic salts of hydrogen cyanide, hydrogen sulfide, lower alkyl mercaptans or lower alcohols as reactants. The preferred metal salts are those of the alkali metals, especially sodium and potassium. Other metal salts such as the lead, zinc, magnesium salts can also be used.

Alternatively, the methoxy and methyl-mercapto ethers are prepared by methylation of the oxy- or mercapto groups with dimethyl sulfate or diazo methane according to known methods.

Oxidation of the monohydroxy group produces the corresponding mono-keto compounds (Formula II). Suitable oxidizing agents are chromium trioxide, potassium dichromate and potassium permanganate. The oxidation of the hydroxy group or groups can be accomplished before, after or simultaneously with introduction of the N-oxide groups.

Dehydration of the monohydroxy compounds by suitable agents, e.g., sulfuric acid, produces the corresponding mono-unsaturated compounds (Formula III).

The novel carboxy and carbo(lower)alkoxy derivatives are prepared by condensation of the appropriate 1,2-cyclohexanedione mono- or dicarbo(lower)alkoxy compound, e.g., 1,2-cyclohexanedione-3-ethylcarboxylate, 1,2 - cyclohexanedione - 3,6 - diethylcarboxylate, with o-phenylenediamine, generally in the presence of a small amount of acid such as concentrated hydrochloric acid, in a reaction-inert solvent followed by peracid oxidation to the desired oxide. Suitable solvents are benzene, xylene, toluene and other aromatic hydrocarbons. The reaction is conducted at an elevated temperature, preferably at the reflux temperature of the solvent system, with removal of water as by azeotropic distillation.

Acid hydrolysis of the carbo(lower)alkoxy derivatives with a mineral acid (hydrochloric, hydrobromic, sulfuric, nitric, phosphoric) or with an alkali or alkaline earth hydroxide, bicarbonate or carbonate produces the carboxy derivative. Alternatively, the carboxy derivatives are produced by hydrolysis, preferably acid hydrolysis, of the corresponding cyano derivatives. Subsequent esterification of the acid derivatives provides the esters according to known procedures.

The unsaturated compounds of Formula III participate in electrophilic addition reactions with a variety of nucleophilic reagents such as the hydrogen halides, primary and secondary amines, hydrogen cyanide, hypohalous acids, halogens and epoxide formation to produce novel compounds useful as antibacterial agents and as intermediates for the production of a variety of products, many of which are antibacterial agents.

The acid addition salts are prepared by dissolving the free base in a suitable non-aqueous solvent, e.g., acetone, ether, lower aliphatic alcohols (ethanol, isopropanol) containing the desired acid, or to which the stoichiometric amount of the desired acid is added. Acid salts containing 1:1 and 2:1 molar ratios of acid to base are thus prepared. The alkali metal and alkaline earth metal salts of the mono- and dicarboxy substituted compounds of this invention are prepared by simple neutralization of the acid derivative in aqueous solution with the appropriate metal hydroxide, carbonate or bicarbonate and recovered by precipitation with a non-solvent, evaporation of the solvent or by lyophilization.

Many of the compounds described herein have, in addition to the above-mentioned utilities, unexpectedly significant activity in vivo against a variety of small and medium viruses such as the myxoviruses and especially against influenza PR8 and BGL. Care should, of course, be exercised when using these compounds for this purpose. Therapeutic dosages and regimens commensurate with the therapeutic index of these compounds can be administered without substantial adverse effect.

When used for the purposes described herein the quinoxaline-di-N-oxides can, of course, be used in combination with other known drugs such as the tetracycline-type antibiotics, carbomycin, neomycin, bacitracin and tylosin.

In addition to the above-mentioned utilities, the quinoxaline-di-N-oxides described herein have unexpectedly been found to exhibit activity against antibiotic-resistant strains of micro-organisms, such as antibiotic-resistant strains of *Escherichia coli* originally isolated from poultry and from man. Further, this unexpected activity is surprisingly applicable to micro-organisms in which resistance to antibiotics has been induced, as by exposure to other micro-organisms already resistant to antibiotics.

The following examples are provided solely for the purpose of illustration.

EXAMPLE I 1,2,3,4-tetrahydrophenazine-5-oxide

To a solution of 1,2,3,4-tetrahydrophenazine (250 g.) in acetic acid (one l.) at room temperature, paracetic acid (40%, 200 ml.) is added dropwise with stirring during 2 hours. After standing for an additional 16 hours the reaction mixture is poured into 5 liters of water with stirring and after 2 hours the crude product filtered off. Crystallization from acetone/water yields the crystalline product (123 g.); M.P. 93–99° C. Recrystallization from an acetone/water mixture yields the pure product.

EXAMPLE II 1-acetoxy-1,2,3,4-tetrahydrophenazine 1,2,3,4-tetrahydrophenazine-5-oxide (5 g.) is dissolved in acetic anhydride (25 ml.) and refluxed for 2 hours using a Sunbeam lamp as the source of heat. The excess acetic anhydride is removed in vacuo and the residual gum chromatographed on a column of acid-washed Florisil (synthetic magnesium silicate) using benzene as eluant. The product is collected and crystallized from acetone/hexane. Recrystallization from acetone/hexane gives the pure compound.

Substitution of acetic anhydride by the appropriate anhydrides produces the following compounds: 1-propionyloxy, 1-butyryloxy, 1-isobutyryloxy, 1-caproyloxy, 1-benzoyloxy and 1-p-toluenesulfonyloxy-1,2,3,4-tetrahydrophenazines.

EXAMPLE III 1-acetoxy-1,2,3,4-tetrahydrophenazine-5,10-dioxides 1-acetoxy-1,2,3,4 - tetrahydrophenazine (30 g.) is dissolved in acetic acid (250 ml.) and then, at room temperature and with stirring, 40% peracetic acid (250 ml.) is added dropwise with stirring during one hour. The reaction mixture is allowed to stand at room temperature for 7 days. It is then poured into 3 liters of water and extracted with chloroform. The chloroform extract is washed to neutrality with saturated sodium bicarbonate solution, dried ($Na_2SO_4$) and the chloroform removed in vacuo to yield a residue of the crude product. Recrystallization from chloroform/hexane yields the pure product; M.P. 170°–170.5° C. (dec.).

*Analysis.*—Calc'd for $C_{14}H_{14}O_4N_2$ (percent): C, 61.31; H, 5.15; N, 10.21. Found (percent): C, 61.41; H, 5.17; N, 10.27.

IR ($CHCl_3$) Principal absorption maxima 5.74, 7.34, 7.6, 9.16, 10.5 microns

In like manner the remaining compounds of Example II are converted to their corresponding 5,10-dioxides.

EXAMPLE IV 1-hydroxy-1,2,3,4-tetrahydrophenazine-5,10-dioxide 1-acetoxy-1,2,3,4-tetrahydrophenazine - 5,10 - dioxide (20 g.) is dissolved in concentrated hydrochloric acid (70 ml.) and allowed to stand at room temperature for 3 hours. The acid is then evaporated in vacuo at 35–40° C. and the residue crystallized from chloroform/hexane to give 15.5 g. of product; M.P. 161.5°–163° C. Recrystallization affords the pure product; M.P. 169°–171° C.

*Analysis.*—Calc'd for $C_{12}H_{12}O_3N_2$ (percent): C, 62.06; H, 5.21; N, 12.06. Found (percent): C, 62.06; H, 5.37; N, 12.02.

U.V.($CH_3CH$)= 232 264(sh)* 367 378
 =17,500 31.000 10,000 11,700

*Shoulder.

Application of this procedure to the remaining products of Example III produces the same compound.

EXAMPLE V

Isomeric 1,4-dihydroxy-1,2,3,4-tetrahydrophenazine-5,10-dioxides

A mixture of isomeric 1,4 - diacetoxy-1,2,3,4-tetrahydrophenazine-di-N-oxides (10 g.) is dissolved in 100 ml. concentrated hydrochloric acid by swirling at room temperature. The solution is allowed to stand at room temperature for 3 hours and is then degased by rotating in a round-bottomed flask under vacuum. The pH of the solution is then brought to pH 8 by the addition, with stirring, of 10% sodium hydroxide solution while maintaining the temperature below 40° C. The mixture is then extracted with chloroform, the chloroform solution dried ($Na_2SO_4$), treated with activated charcoal, filtered and the solvent is removed in vacuo to yield a solid residue of the isomeric products.

The residue is then dissolved in 50 ml. dimethyl sulfoxide at 25° C. whereupon a dimethylsulfoxide complex of one isomeric form separates. Recrystallization of the dimethylsulfoxide complex from chloroform-hexane provides the pure compound (isomer A); M.P. 165°–166° C. (dec.). The second isomer (B) is obtained by removal of the dimethylsulfoxide from the mother liquors and crystallization of the residue from benzene. Recrystallization from chloroform hexane yields the pure product; M.P. 170°–172° C. (dec.).

The above separation procedure is repeated but under the following conditions:

| T, C.: | DMSO*/gm. isomeric |
|---|---|
| 20° | 5 |
| 20° | 7 |
| 30° | 10 |
| 40° | 3 |
| 40° | 7 |
| 25° | 15 |
| 50° | 5 |

*DMSO=Dimethylsulfoxide.

In each instance efficient separation of isomers occurs. However, optimum results appear to occur within the temperature range of 20°–30° C.

EXAMPLE VI 1,4-diacetoxy-1,2,3,4-tetrahydrophenazine-5,10-dioxides

A mixture of isomeric 1,4-diacetoxy-1,2,3,4-tetrahydrophenazines (100 g.) is dissolved in acetic acid (100 ml.) and 40% peracetic acid (500 ml.) is added dropwise at such a rate that the temperature does not exceed 45° C. After standing at room temperature for 3 days the product is isolated by pouring the mixture into excess water, followed by extraction with chloroform. The chloroform solution is washed several times with 2 N sodium hydroxide solution and then with saturated ferrous sulfate solution. Drying with anhydrous sodium sulfate and removal of the solvent yields the crude product. The isomeric diacetate-di-N-oxides are isolated by fractional crystallization from chloroform/hexane solution. The diacetoxy derivative of the isomeric 1,4-dihydroxy compound (isomer A) melts at 225° C. (dec.). The diacetoxy derivative of the higher melting 1,4-dihydroxy compound (isomer B) is 204° C. (dec.).

EXAMPLE VII 1,4-dibenzoyloxy-1,2,3,4-tetrahydrophenazine-5,10-dioxide

To a stirred solution of 1,2,3,4-tetrahydrophenazine-5,10-dioxide (10.0 g.) in dry tetrahydrofuran (200 ml.) there is added a solution of benzoyl chloride (25 ml.) in dry tetrahydrofuran (50 ml.) over a period of two hours. A slight exothermic reaction occurs at the start of the addition and the initial suspension rapidly clears. The reaction mixture is stirred for three hours following completion of addition then taken to dryness in vacuo at below 40° C. The residue is taken up in chloroform and the solution thoroughly washed with a saturated aqueous solution of sodium bicarbonate. The solution is then dried with anhydrous sodium sulfate, decolorized, filtered and evaporated to dryness. The residue is triturated with acetone to give 1,4-dibenzoyloxy - 1,2,3,4 - tetrahydrophenazine (12 g.). It is purified by crystallization from chloroform-hexane; M.P. 214°–215° C. (dec.).

*Analysis.*—Calc'd for $C_{26}H_{20}N_2O_4$ (percent): C, 73.57; H, 4.75; N, 6.60. Found (percent): C, 73.58; H, 4.80; N, 6.56.

The free base (12 g.) is dissolved in chloroform (250 ml.) and m-chloroperbenzoic acid (13.2 g.) added. The mixture is swirled until solution is complete then allowed to stand at room temperature for three days. It is then refluxed for 18 hours, cooled and washed with a saturated aqueous solution of sodium bicarbonate. After drying with anhydrous sodium sulfate the solution is evaporated to dryness to give the desired dioxide (9.4 g.). Recrystallization from chloroform-hexane affords the pure product; M.P. 228°–229° C. (dec.).

*Analysis.*—Calc'd for $C_{26}H_{20}N_2O_6$ (percent): C, 68.41; H, 4.42; N, 6.14. Found (percent): C, 68.06; H, 4.51; N, 6.00.

Hydrolysis of the product is accomplished by dissolving 0.5 g. of the product in concentrated sulfuric acid (5 ml.) and 2.5 ml. water. The mixture is worked up according to the procedure of Example IV after first neutralizing the mixture with sodium bicarbonate.

EXAMPLE VIII 1,4-di-p-toluenesulfonyloxy - 1,2,3,4 - tetrahydrophenazine-5,10-dioxide A solution of p-toluenesulfonyl chloride (5.71 g.) in dry tetrahydrofuran (50 ml.) is added dropwise over a 20-minute period to a solution of 1,2,3,4-tetrahydrophenazine-5,10-dioxide (2.16 g.) in dry tetrahydrofuran (100 ml.). When about ⅓ of the p-toluenesulfonyl chloride solution is added, 5 drops of pyridine are added and the addition completed. The mixture is refluxed for 1.5 hours then evaporated to dryness in vacuo. The residue is taken up in chloroform, the solution washed with 3×300 ml. of saturated aqueous sodium bicarbonate solution, dried ($Na_2SO_4$), decolorized and evaporated to dryness. The residue is chromatographed on acid-washed Florisil (a silica-base adsorbent available from The Floridin Co., Warren, Pa.) using chloroform as solvent. The first 250 ml. of eluate is collected and evaporated to dryness. The residue is extracted with boiling ether and the ether solution evaporated to dryness. The residue is recrystallized first from ether-hexane then several times from acetone-hexane to give a product melting at 122.5°–124° C. (dec.).

Oxidation of the product by the procedure of Example VII provides the desired dioxide.

Hydrolysis according to the procedure set forth in Example VII provides 1,4 - dihydroxy - 1,2,3,4 - tetrahydrophenazine.

EXAMPLE IX 1,4-diacetoxy - 1,2,3,4 - tetrahydrophenazine-5,10-dioxide

To a suspension of 1,2,3,4-tetrahydrophenazine-5,10-dioxide (4.32 g.) in dry tetrahydrofuran (50 ml.) is added a solution of acetyl chloride (5.0 g.) in dry tetrahydrofuran (50 ml.), over a 30-minute period. The mixture is heated on a steam bath for 15 minutes then evaporated to dryness. The residue is dissolved in chloroform, the solution washed with saturated aqueous sodium bicarbonate and dried ($Na_2SO_4$). The chloroform solution is decolorized then evaporated to dryness to give 1,4-diacetoxy-1,2,3,4-tetrahydrophenazine.

Oxidation according to the procedure of Example VII produces the desired 5,10-dioxide.

Repetition of this experiment but using the appropriate acid chloride in place of acetyl chloride produces the following 1,4-diacyloxy - 1,2,3,4 - tetrahydrophenazine-5,10-dioxides:

1,4-dipropionyloxy-
1,4-dibutyryloxy-
1,4-dicaproyloxy-

EXAMPLE X 1,4-dicarbethoxy-1,2,3,4-tetrahydrophenazine

To 1,2 - cyclohexanedione-3,6-diethylcarboxylate (9.0 g.) dissolved in benzene (250 ml.), o-phenylenediamine (3.75 g.) and one drop of concentrated hydrochloric acid are added and the mixture refluxed for 3 hours, the by-product water being removed by means of a Dean-Stark trap. The benzene is removed in vacuo and the crude product extracted with chloroform. The crude product remaining after removal of the chloroform is chromatographed on a Florisil column using chloroform as eluant. The product is obtained as yellow crystals from acetone.

In like manner the following 1,4-di(carbo(lower)alkoxy) derivatives are prepared from the appropriate diester of 1,2 - cyclohexanedione-3,6-dicarboxylic acid: the dicarbomethoxy-, dicarbopropoxy-, dicarboisopropoxy-, dicarbovaleroxy- and dicarbobutoxy-. The required diesters are prepared by the procedure of Broun, J. Gen. Chem. (U.S.S.R.) 6, 612–615 (1936) by condensation of the proper di(carbo(lower)alkoxy)adipate with the corresponding di(carbo(lower)alkoxy)oxalate in the presence of sodium and alcohol (Claisen condensation).

EXAMPLE XI 1,4-dicarbethoxy-1,2,3,4-tetrahydrophenazine-5,10-dioxide

A solution of 1,4-dicarbethoxy-1,2,3,4-tetrahydrophenazine (205 g.) and m-chloroperbenzoic acid (500 g.) in chloroform (2 liters) is allowed to stand at room temperature for 3 days. The by-product, m-chlorobenzoic acid, is filtered off and the filtrate refluxed for 30 minutes then washed repeatedly with a saturated solution of sodium bicarbonate. Removal of the chloroform in vacuo gives a residue of the crude product which is chromatographed on activated alumina (Grade 1) using benzene as eluant. Removal of the benzene and crystallization of the residue from acetone gives the product as yellow needles. Recrystallization from acetone provides the pure dioxide.

Oxidation of the remaining esters of Example X produces the corresponding dioxides.

EXAMPLE XII 1,4 - dicarboxy-1,2,3,4-tetrahydrophenazine-5,10-dioxide 1,4 - dicarbethoxy - 1,2,3,4 - tetrahydrophenazine-5,10-dioxide (5 g.) is dissolved in ethanol (250 ml.) and 2 N HCl (50 ml.). The solution is refluxed for 6 hours then concentrated to ⅓ volume. The crystalline product separates on cooling.

The remaining products of Example XI are hydrolyzed to the same product by this procedure.

Neutralization of the dicarboxylic acids with 1 and 2 molar proportions of sodium, potassium, calcium and magnesium hydroxide provides the corresponding metal salts.

EXAMPLE XIII 1-bromo-1,2,3,4-tetrahydrophenazine-5,10-dioxide

To a solution of 1,2,3,4-tetrahydrophenazine-5,10-dioxide (21.6 g., 0.1 mole) in chloroform (250 ml.) there is added, with stirring at room temperature, a solution of bromine (16 g.) in chloroform (250 ml.) dropwise during 3 hours. The bromine is added at such a rate that the bromine color disappears after each addition. Stirring is continued for an additional hour following completion of addition. The chloroform solution is washed with saturated sodium bicarbonate solution and the product isolated by concentration of the chloroform solution and crystallization of the residue from chloroform/hexane.

Repetition of this procedure but substituting the proper halogen and the appropriate 1,2,3,4-tetrahydrophenazine-5,10-dioxide for the above reactants yields the following compounds:

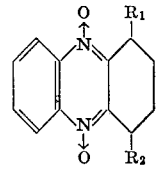

| $R_1$: | $R_2$ |
|---|---|
| Cl | H |
| Cl | —$OCOCH_3$ |
| Br | —CCO—i—$C_3H_7$ |
| Br | —$OCOC_6H_5$ |
| Br | —$OCOC_5H_{11}$ |
| Cl | —$COOC_4H_9$ |
| Cl | —OH |
| Br | —OH |
| Cl | —$OCH_3$ |

| $R_1$: | $R_2$ |
|---|---|
| Cl | —$OC_2H_5$ |
| Br | —$OC_5H_{11}$ |
| Br | —$OC_2H_5$ |
| Br | —SH |
| Cl | —$SCH_3$ |
| Br | —$SC_6H_{13}$ |
| Cl | —CN |
| Br | —COOH |
| Br | —$COOC_2H_5$ |
| Br | p-Toluenesulfonyloxy |

EXAMPLE XIV 1,4-dibromo-1,2,3,4-tetrahydrophenazine-5,10-dioxide

Following the procedure of Gordon, U.S. 2,921,937, Example II, 1,2,3,4-tetrahydrophenazine - 5,10 - dioxide (216 g., 1 mole), 1000 ml. of chloroform and 2.13 moles of bromine in 800 ml. of chloroform are refluxed for 2 hours during which time hydrogen bromide is evolved. The mixture is concentrated to half volume in vacuo then cooled to 10°–15° C. and filtered to remove the precipitated hydrogen bromide salt. The free base is obtained by slurrying the salt in an excess of 5% aqueous sodium bicarbonate solution. The base is then filtered off, washed free of inorganic salts and dried; M.P. 171°–173° C. (dec.).

By means of this procedure 1,4-dichloro-1,2,3,4-tetrahydrophenazine-5,10-dioxide is prepared during chlorine in place of bromine.

EXAMPLE XV 1,4-diacetoxy-1,2,3,4-tetrahydrophenazine-5,10-dioxide

The procedure of Example VIII of Gordon, U.S. 2,921,937 is followed. To a solution of 1,4-dibromo-1,2,3,4-tetrahydrophenazine-5,10-dioxide (187 g., 0.5 mole) in 1500 ml. of chloroform there is added acetic acid (2.75 mole) together with triethylamine (1.25 mole). The reaction mixture is refluxed in the dark for 4 hours then concentrated to about 150 ml. to obtain a mixture of the isomeric 1,4-diacetoxy-1,2,3,4-tetrahydroxybenzaine-5,10-dioxides. The product is identical to that of Example IX.

The mixtures are separated by fractional crystallization from chloroform. The individual fractions are purified by recrystallization from acetone or methanol.

In like manner but using the desired halo substituted derivatives of Examples XIII, XX and XXIII as reactants the following compounds are prepared therefrom by reaction with the appropriate acid: 1-hydroxy-4-p-toluenesulfonyl-, 1-acetoxy-4-carboxy-, 1-hydroxy-4-acetoxy-, 1-acetoxy-4-ethoxy-1-butyryloxy-4-mercapto-, 1-benzoyloxy-4 - hydroxy-1,2,3,4-tetrahydrophenazine-5,10-dioxide; and 4-acetoxy-, 4-p-toluenesulfonyloxy- and 4-propionyloxy-3,4-dihydrophenazine-5,10-dioxide.

EXAMPLE XVI 1,4-diformyloxy-1,2,3,4-tetrahydrophenazine--5,10-dioxide

Acetoformic acid reagent (50 ml.) is added to isomeric 1,4-dihydroxy - 1,2,3,4 - tetrahydrophenazine-5,10-dioxide (10 g.) in pyridine (40 ml.) at 0° C. After one-half hour in the ice bath the reaction mixture is poured into ice water and the product extracted with chloroform and recovered therefrom after drying by removal of the solvent.

Formylation of the 1,4-dihydroxy compound by the procedure of Nesmoyanov, et al. Ber. 67, 370 (1934) using formyl fluoride produces the same product.

The mono and dihydroxy compounds of Examples IV and V are similarly formylated.

EXAMPLE XVII 1-cyano-1,2,3,4-tetrahydrophenazine-5,10-dioxide 1-bromo-1,2,3,4-tetrahydrophenazine-5,10-dioxide (12.0 g.) is dissolved in a solution of potassium cyanide (5 g.) and KI (0.5 g.) in methanol (one liter) by stirring at room temperature. After standing 2 days at room temperature the solution is diluted with 2 liters of water and extracted with chloroform. Removal of the chloroform yields the product as a solid.

The following cyano derivatives of Formula I wherein $R_1$ is CN are similarly prepared from the appropriate bromo derivatives of Examples XIII and XIV. In the case of the dicyano derivative the proportion of potassium cyanide used is doubled.

$R_2$:
—CN
—$COOC_6H_5$
—COO-i-$C_3H_7$
—$OCOC_5H_{11}$
—$COOC_4H_9$
—OH
—$OCH_3$
p-Toluenesulfonyloxy
—$OC_5H_{11}$
—SH
—$SCH_3$
—$SC_6H_{13}$
—COOH
—$COOC_2H_5$
—$OC_2H_5$

EXAMPLE XVIII 1-carboxy-1,2,3,4-tetrahydrophenazine-5,10-dioxide 1-cyano-1,2,3,4-tetrahydrophenazine-5,10-dioxide (5.0 g.) is dissolved in a solution of acetic acid (100 ml.) and 10% hydrochloric acid (50 ml.) and refluxed for 2 hours. Removal of the solvent affords the solid product.

The cyano derivatives of Example XVII are likewise hydrolyzed to their respective acids. The compounds bearing lower alkanoyloxy or carbo (lower)alkoxy groups are, of course, hydrolyzed to the precursor hydroxy and carboxy derivatives. They are reacylated or re-esterified according to known procedures.

The carboxy compounds thus produced are converted to their sodium, potassium, calcium and magnesium salts by neutralization in aqueous solution with the appropriate metal hydroxide. The salts are recovered by lyophilization.

EXAMPLE XIX 1-carbomethoxy-1,2,3,4-tetrahydrophenazine-5,10-dioxide 1-carboxy-1,2,3,4-tetrahydrophenazine - 5,10 - dioxide (5.0 g.) is dissolved in a mixture of chloroform (200 ml.), methanol (5 ml.) and concentrated sulfuric acid (2 ml.) and refluxed for 16 hours. The solution is washed with water (3×500 ml.), dried over anhydrous sodium sulfate and evaporated to a gum. Crystallization from acetone/hexane gives the pure product.

In like manner the carboxy acid derivatives of Example XVIII are converted to their corresponding methyl esters. Substitution of methanol by ethanol, propanol, n-butanol and isopropanol produces the corresponding lower alkyl esters.

EXAMPLE XX 1-bromo-1,2,3,4-tetrahydrophenazine-5,10-dioxide 1-hydroxy - 1,2,3,4 - tetrahydrophenazine-5,10-dioxide (12.0 g.) dissolved in a mixture of pyridine (50 ml.) and chloroform (100 ml.) is treated with phosphorus tribromide (15 g.). The mixture is allowed to stand at room temperature for 24 hours then washed with water (3×500 ml.). The product is isolated from the residue obtained after removal of the chloroform by vacuum distillation. It is identical to the title product of Example XIII.

Following this procedure the 1,4-dihydroxy compounds of Example V are converted to 1,4-dibromo-1,2,3,4-tetrahydrophenazine-5,10-dioxides.

EXAMPLE XXI 1-methylmercapto-1,2,3,4-tetrahydrophenazine-5,10-dioxide 1-bromo-1,2,3,4-tetrahydrophenazine-5,10-dioxides (25 g.) is added to a solution of sodium methylmercaptide (10 g.) in ethanol (1 liter). The mixture is stirred for 48 hours at room temperature then poured into water (3 liters) and the resulting solution extracted with chloroform. The chloroform solution is dried over anhydrous sodium sulfate and evaporated to a gum which is crystallized from acetone/hexane to yield the crystalline product.

This procedure is repeated but using the appropriate mercaptide and the halogenated 1,2,3,4-tetrahydrophenazine-5,10-dioxides of Examples XIII and XIV to produce the following compounds:

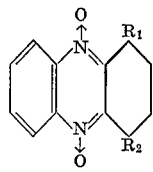

| $R_1$: | $R_2$ |
|---|---|
| $-SC_2H_5$ | H |
| $-SC_4H_9$ | H |
| $-SC_6H_{13}$ | H |
| $-SCH_3$ | $-SCH_3$ |
| $-SC_4H_9$ | $-SC_4H_9$ |
| $-SH$ | H |
| $-SH$ | $-SH$ |
| $-SH$ | $-OCOCH_3$ |
| $-SCH_3$ | $-OH$ |
| $-SCH_3$ | $-OC_5H_{11}$ |
| $-SCH_3$ | $-OCOC_6H_5$ |
| $-SCH_3$ | $-CH$ |
| $-SC_2H_5$ | $-COOH$ |
| $-SC_2H_5$ | $-COOC_4H_9$ |
| $-SC_5H_{11}$ | $-OH$ |
| $-SH$ | $-OH$ |
| $-SC_2H_5$ | $-CCO-i-C_3H_7$ |
| $-SCH_3$ | p-Toluenesulfonyloxy |

EXAMPLE XXII

Lower alkoxy substituted 1,2,3,4-tetrahydrophenazine-5,10-dioxides

Repetition of the procedure of Example XXI but using the appropriate sodium alkoxide as reactant in place of sodium methyl mercaptide produces the following compounds:

| $R_1$: | $R_2$ |
|---|---|
| $-OC_2H_5$ | N |
| $-OCH_3$ | H |
| $-OC_4H_9$ | H |
| $-OCH_3$ | $-OCH_3$ |
| $-SC_3H_7$ | $-CO_3H_7$ |
| $-O-i-C_3H_7$ | H |
| $-OCH_3$ | $-OCOC_6H_5$ |
| $-OCH_3$ | $-OH$ |
| $-OC_3H_7$ | $-OH$ |
| $-OC_5H_{11}$ | $-OC_5H_{11}$ |
| $-OCH_3$ | $-SCH_3$ |
| $-OC_2H_5$ | COOH |
| $-OC_2H_5$ | CN |
| $-OCH_3$ | $-COO-i-C_3H_7$ |
| $-OCH_3$ | $-COOC_4H_9$ |
| $-OC_6H_{13}$ | $-OCOC_5H_{11}$ |
| $-OC_5H_{11}$ | H |
| $-OCH_3$ | p-Toluenesulfonyloxy |

EXAMPLE XXIII 3,4-dihydrophenazine-5,10-dioxide 1-hydroxy-1,2,3,4-tetrahydrophenazine-5,10-dioxide (4.0 g.) is dissolved in concentrated sulfuric acid (15 ml.) at room temperature. The solution rapidly turns dark-green and, after 10 minutes, is poured into cracked ice and the aqueous mixture extracted with chloroform. The chloroform solution is dried with anhydrous sodium sulfate then evaporated in vacuo. The residue is crystallized from chloroform/hexane. Recrystallization from chloroform/hexane affords the pure product as bright yellow crystals.

Application of this procedure to the hydroxy substituted compounds of Examples XIII, XVII–XIX, XXI and XXII produces the corresponding unsubstituted compounds having the formula:

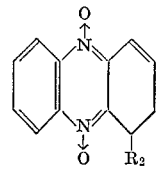

wherein $R_2$ is $-Cl$, $-Br$, $-CN$, $-COOC_6H_5$, $-COOC_2H_5$, $-COOC_3H_7$, $-COO-n-C_4H_9$, $-SCH_3$, $-SC_5H_{11}$, $-SH$, $OCH_3$, $-OC_3H_7$, $-COOH$, $-COOCH_5$, $-COOCH_3$ and p-toluenesulfonyloxy.

EXAMPLE XXIV 1-bromo-4-carbethoxy-1,2,3,4-tetrahydrophenazine-5,10-dioxide

To 1-carbethoxy-1,2,3,4-tetrahydrophenazine-5,10-dioxide (14.0 g.) in chloroform (250 ml.) at reflux is added a solution of bromine (8 g.) in chloroform (100 ml.) dropwise during 30 minutes. After an additional 30 minutes at reflux the solution is cooled, washed with saturated sodium bicarbonate and dried with anhydrous sodium sulfate. Evaporation of the chloroform in vacuo at 30°–40° C. provides the product.

In like manner the methyl, isopropyl and amyl esters are prepared from the appropriate 1-carbo(lower)alkoxy-1,2,3,4-tetrahydrophenazine-5,10-dioxide. Acid hydrolysis of the carbo(lower)alkoxy groups by the procedure of Example XII produces the corresponding acid.

EXAMPLE XXV 1-oxo-1,2,3,4-tetrahydrophenazine-5,10-dioxide 1-hydroxy-1,2,3,4-tetrahydrophenazine-5,10-dioxide (6.5 g.) is dissolved in alcohol-free chloroform (200 ml.) and shaken with a solution of chromium trioxide (10 g.) in water (50 ml.) for 12 hours. The chloroform layer is separated, washed with water, dried with anhydrous sodium sulfate and evaporated in vacuo to give the desired product.

Similarly, the hydroxy derivatives of Examples XIII, XVII–XIX, XXI and XXII are oxidized to the corresponding oxo-derivatives.

EXAMPLE XXVI 1-oxo-4-acetoxy-1,2,3,4-tetrahydrophenazine-5,10-dioxide 1-oxo-4-bromo-1,2,3,4-tetrahydrophenazine-5,10-dioxide (3.0 g., 0.01 mole) is treated with acetic acid (0.05 mole) and triethylamine (0.03 mole) according to the procedure of Example XV to give the title product.

Repetition of the procedure of this example but using propionic, butyric, benzoic and p-toluenesulfonic acids in place of acetic acid produces the corresponding acyloxy compounds.

EXAMPLE XXVII 1-oxo-4-hydroxy-1,2,3,4-tetrahydrophenazine-5,10-dioxide

Acid hydrolysis of the title compound of Example XXVI according to the procedure of Example IV affords the title compound.

EXAMPLE XXVIII

Acid addition salts

Method A.—Dry hydrogen chloride gas is bubbled into a methanol solution of the desired 1,2,3,4-tetrahydrophenazine-5,10-dioxide compound at room temperature until precipitation of the salt is complete.

Method B.—The desired dihydro- or tetrahydrophenazine-5,10-dioxide (0.01 mole) is dissolved in methanol and a stoichiometric amount of mineral acid added. The solution is stirred at room temperature for 30 minutes and the acid salt recovered by evaporation of the solvent or by precipitation with a non-solvent, e.g., ether. In this way the acid addition salts of sulfuric, nitric, hydrochloric, hydrobromic and phosphoric acids are prepared.

EXAMPLE XXIX

The efficacy of the herein described compounds in promoting the growth of chicks is demonstrated in a series of tests conducted with 60 one-day old broilers (30 cokerels and 30 pullets) of the Cobbs strain. In these tests the day-old chicks are divided into 6 lots of 10 each of one sex, and kept in electrically heated brooders on raised wire floors. Each lot is assigned to a different compartment and fed a basal diet supplemented with 10 g./ton and 125 g./ton of 1,4-dihydroxy-1,2,3,4-tetrahydrophenazine-5,10-dioxide (isomer A). A control in which no supplementation is added is also run. Each of the dietary treatments is evaluated in two replicate pens (one pen of cockerels and one pen of pullets). The growth and feed efficiency responses to each group are observed to 8 weeks of age. The composition of the basal ration is indicated below. The supplements are added to the diet in premix form at the expense of the ground yellow corn.

RATION FORMULATION

| Ingredients: | Percent |
|---|---|
| Ground yellow corn | 42.18 |
| Soybean oil meal (50% protein) | 39.54 |
| Meat scraps (50% protein) | 4.00 |
| Fish solubles (100-S) (52% protein) | 2.00 |
| Dried whole whey | 2.00 |
| Dried brewer's yeast | 2.00 |
| Alfalfa meal (17% protein) | 2.00 |
| Stabilized animal fat | 2.00 |
| Multi-foa (dicalciumphosphate) | 2.50 |
| Vitamin pre-mix [a] | .50 |
| Iodized salt | .40 |
| Choline chloride, 25% | .40 |
| Vigofac 6 [b] | .30 |
| Di-methionine | .10 |
| Delamix (quad) [c] | .08 |
| Total | 100.00 |

[a] Vitamin—5% of feed:

| | Percent of premix |
|---|---|
| Vitamin A-10 | 10 |
| Vitamin D₃-3000 | 10 |
| Choline chloride (25%) | 35.25 |
| Niacin (80%) | 0.55 |
| Calcium pantothenate (45%) | 10 |
| Riboflavin-4 | 0.39 |
| B-12-60 | 0.2 |
| Vigofac-6 | 30 |
| Fine Corn Meal | 3.75 |

[b] Vigofac is the registered trademark of Chas. Pfizer & Co., Inc. for unidentified poultry and livestock growth factors obtainable from Streptomyces fermentation sources.

[c] Delamix is the trademark name for a trace mineral premix manufactured by The Limestone Products Corporation of America, Newton, N.J., and having the following composition:

| Ingredients: | Percent |
|---|---|
| Manganese | 12.0 |
| Iodine | 0.2 |
| Iron | 4.0 |
| Copper | 0.4 |
| Cobalt | 0.08 |
| Magnesium | 3.6 |

The chicks are observed daily, weighed weekly and the average gain per bird, the growth index and feed efficiency determined.

The 1,4-dihydroxy-1,2,3,4-tetrahydrophenazine-5,10-dioxide supplemented diet is found to produce a significant increase in weight gained and a substantial improvement in feed efficiency at each level of supplementation.

Repetition of this procedure but using the following quinoxaline-5,10-dioxides produces similar results:

1,2,3,4-tetrahydrophenazine-5,10-dioxide
1,4-dihydroxy-1,2,3,4-tetrahydrophenazine-5,10-dioxide (isomer B)
1,4-diacetoxy-1,2,3,4-tetrahydrophenazine-5,10-dioxide (isomer A)
1,4-diacetoxy-1,2,3,4-tetrahydrophenazine-5,10-dioxide (isomer B)
1-hydroxy-1,2,3,4-tetrahydrophenazine-5,10-dioxide
1,4-dicarbethoxy-1,2,3,4-tetrahydrophenazine-5,10-dioxide
1-oxo-4-acetoxy-1,2,3,4-tetrahydrophenazine-5,10-dioxide
1,4-dimethoxy-1,2,3,4-tetrahydrophenazine-5,10-dioxide
1,4-dibromo-1,2,3,4-tetrahydrophenazine-5,10-dioxide
1-oxo-1,2,3,4-tetrahydrophenazine-5,10-dioxide
1,4-dihydroxy-1,2,3,4-tetrahydrophenazine-5,10-dioxide.

EXAMPLE XXX

Groups of baby pigs are fed on a completely balanced diet previously proven highly useful for this type of animal. These animals, weaned at approximately six to eight days of age, are fed over several days on a pre-starter diet containing 60.1 percent dry skimmed milk, 10.1 percent soybean oil, 9.9 percent glucose hydrate, 1.1 percent brewer's yeast, 0.4 percent of oxytetracycline feed supplement containing 5 g./lb. of oxytetracycline, 16 percent soybean oil meal and a complete vitamin and mineral supplement. The pigs are then fed a "starter diet" of fine ground yellow corn, rolled oats, soybean oil meal, glucose hydrate, dicalcium phosphate, iodized salt, soybean oil, oxytetracycline supplement, vitamin mix and mineral mix. The starter feed for some of the groups is supplemented with 100 g./ton of 1,4-dihydroxy-1,2,3,4-tetrahydrophenazine-5,10-dioxide. This feed is given the animals when they are about three weeks old and continued over a total of 4 weeks.

The supplemented diet is found to result in economically important weight gain and significant improvement in feed efficiency.

EXAMPLE XXXI

The procedure of Example XXX is repeated but using an isomeric mixture of 1,4-dihydroxy-1,2,3,4-tetrahydrophenazine-5,10-dioxide at levels of 50, 100 and 250 g./ton of feed. In each case improvement in growth rate and feed efficiency is noted.

EXAMPLE XXXII

The efficacy of the isomeric forms A and B of 1,4-dihydroxy-1,2,3,4-tetrahydrophenazine-5,10-dioxide in the treatment of *Mycoplasma gallisepticum* infections in poultry is demonstrated as follows:

Four groups of 10 birds each are subjected to the following schedule:

Group 1, a control group, receives no infection and no medication.

Group 2, a control group, is exposed to *Mycoplasma gallisepticum* infection and receives no medication.

Group 3 is exposed to *Mycoplasma gallisepticum* infection and receives normal 1,4-dihydroxy-1,2,3,4-tetrahydrophenazine-5,10-dioxide in the feed at a rate of 250 g./ton of feed for 5 days starting one day before exposure.

Group 4, same as group 3, but receives 1,4-dihydroxy-1,2,3,4-tetrahydrophenazine-5,10-dioxide (isomer A) in place of the isomer B compound.

Pertinent data demonstrating the value of these drugs are given below:

| Group | Percent mortality | Lesion score | Performance index [1] |
|---|---|---|---|
| 1 Non-infected control | 0 | 0 | 100 |
| 2 Infected, non-medicated control | 0 | 3.2 | 85.5 |
| 3 Infected, medicated, isomer B | 0 | 1.95 | 93.5 |
| 4 Infected, medicated, isomer A | 0 | 2.65 | 89.9 |

[1] Performance Index ( weight gain of test birds / weight gain non-infected control ) 100.

EXAMPLE XXXIII

The effectiveness of the herein described compounds against naturally occurring chronic respiratory disease is demonstrated by the following experiment. Two-week old broiler chicks, divided into six groups of 10 birds, are fed a basal diet containing the desired drug at levels of 0.0125 percent, 0.025 percent, 0.05 percent and 0.10 percent, respectively. Two groups are used as control. One control group (A) is administered no medication at all. The medicated rations are fed continuously to the chicks and one control group for two weeks, at the end of which time five birds, naturally infected with chronic respiratory disease, and aeroligically positive, are introduced into each of the test groups but not in the control group (B). The medicated feed is administered to each of the groups until termination of the test 10 days after exposure. The chickens are checked as to mortality, weight gain and after sacrifice for air sac lesions.

Using the following compounds: 1-hydroxy-, 1,4-diacetoxy, 1-oxo-4-hydroxy-, 1-oxo-4-acetoxy, 1-chloro-4-methylmercapto-, 1,4-dibromo-, 1,4 - dimethoxy-1,2,3,4-tetrahydrophenazine-5,10-dioxides and 3,4 - dihydro-, 4-acetoxy-3,4-dihydro-, 4-carboxy-3,4-dihydro- and 4-hydroxy-3,4-dihydrophenazine - 5,10 - dioxides and 1,2,3,4-tetrahydrophenazine-5,10-dioxide significant reduction in the air sac lesion score, and no deaths, are observed in the premedicated chicks. The premedicated chicks also showed weight gains of at least 25 percent over the control group.

It is also observed that the naturally infected birds fed the medicated diet during the 10-day period have lower air sac lesion scores and economically important weight gains relative to naturally infected birds given no medication.

The control group (B) birds are observed to show significant gains in weight and feed efficiency over the control group (A) birds.

What is claimed is:

1. A compound having the formula

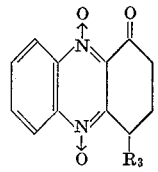

wherein $R_3$ is selected from the group consisting of hydrogen, hydroxy, chloro, bromo, lower alkoxy, mercapto, lower alkylmercapto, cyano, carboxy, carbo-(lower)alkoxy, benzoyloxy, p-toluenesulfonyloxy, and lower alkanoyloxy; and the non-toxic mineral acid addition salts thereof, and when $R_3$ is carboxy, the alkali metal and alkaline earth metal salts thereof.

2. The compound of claim 1 wherein $R_3$ is hydroxy.
3. The compound of claim 1 wherein $R_3$ is hydrogen.
4. The compound of claim 1 wherein $R_3$ is bromo.
5. The compound of claim 1 wherein $R_3$ is methylmercapto.
6. The compound of claim 1 wherein $R_3$ is acetoxy.
7. The compound of claim 1 wherein $R_3$ is carboxy.
8. The compound of claim 1 wherein $R_3$ is carbomethoxy.
9. The compound of claim 1 wherein $R_3$ is methoxy.

References Cited

UNITED STATES PATENTS 2,891,062    6/1959    Ursprung     260—267

ALEX MAZEL, Primary Examiner

A. M. TIGHE, Assistant Examiner

U.S. Cl. X.R.

424—250

UNITED STATES PATENT OFFICE
CERTIFICATE OF CORRECTION

Patent No. 3,563,991  Dated March 30, 1971

Inventor(s) James David Johnston

It is certified that error appears in the above-identified patent and that said Letters Patent are hereby corrected as shown below:

Column 11, line 14, "(30 g.)" should read -- (50 g.) --.
Column 15, line 50, "sulfonyl-" should read -- sulfonyloxy- --.
Column 17, line 57, "-CO$_3$H$_7$" should read -- -OC$_3$H$_7$ --.

Column 18, line 26, "-COOCH$_5$," should read -- -COOCH$_3$, --.

Signed and sealed this 13th day of July 1971.

(SEAL)
Attest:

EDWARD M. FLETCHER, JR.
Attesting Officer

WILLIAM E. SCHUYLER, JR
Commissioner of Patents